US010873278B2

United States Patent
Wei et al.

(10) Patent No.: US 10,873,278 B2
(45) Date of Patent: Dec. 22, 2020

(54) MOTOR DRIVING SYSTEM AND MOTOR OPERATION RECOVERING METHOD

(71) Applicant: DELTA ELECTRONICS, INC., Taoyuan (TW)

(72) Inventors: Chia-Pin Wei, Taoyuan (TW); Yu-Wei Lee, Taoyuan (TW); Wei-Shuo Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 85 days.

(21) Appl. No.: 15/665,843

(22) Filed: Aug. 1, 2017

(65) Prior Publication Data

US 2018/0131294 A1 May 10, 2018

(30) Foreign Application Priority Data

Nov. 10, 2016 (CN) .......................... 2016 1 0989321

(51) Int. Cl.
*H02P 1/04* (2006.01)
*H02P 23/20* (2016.01)
(52) U.S. Cl.
CPC ................ *H02P 1/04* (2013.01); *H02P 23/20* (2016.02); *H02P 2205/07* (2013.01); *Y02P 80/10* (2015.11)
(58) Field of Classification Search
CPC ................................ H02P 1/04; H02P 2205/07
See application file for complete search history.

(56) References Cited

U.S. PATENT DOCUMENTS

| 2002/0185926 | A1* | 12/2002 | King | H02P 6/182 310/68 B |
| 2011/0241447 | A1* | 10/2011 | Ando | G05B 19/4063 307/326 |
| 2012/0134184 | A1* | 5/2012 | Park | H02M 7/49 363/37 |
| 2015/0084557 | A1* | 3/2015 | Nishi | H02P 6/06 318/400.11 |
| 2015/0211533 | A1* | 7/2015 | Nagata | F04C 28/06 318/369 |
| 2017/0088135 | A1* | 3/2017 | Kelly | B60W 30/143 |

FOREIGN PATENT DOCUMENTS

| CN | 102208888 A | 10/2011 |
| CN | 104467562 A | 3/2015 |
| DE | 10 2015 101 069 A1 | 7/2015 |

* cited by examiner

*Primary Examiner* — Kawing Chan
*Assistant Examiner* — Bradley R Brown
(74) *Attorney, Agent, or Firm* — Muncy, Geissler, Olds & Lowe, P.C.

(57) ABSTRACT

A motor driving system is configured for driving a motor, which is under an inertial rotation status without being driven, to stably rotate from an original speed to a target speed. The motor driving system includes a sensing unit, a control unit and a driving unit. The sensing unit detects a real rotating status of the motor. The control unit is electrically connected with the sensing unit and provides a gradual acceleration command based on the real rotating status. The driving unit is electrically connected with the control unit and drives the motor to accelerate stably to the target speed according to the gradual acceleration command. In addition, a motor operation recovering method cooperated with the motor driving system is also disclosed.

18 Claims, 10 Drawing Sheets

| emf level | inverter/converter voltage command | winding voltage |
|---|---|---|
| v1 | Cv1 | Vv1 |
| v2 | Cv2 | Vv2 |
| ⋮ | ⋮ | ⋮ |

FIG. 4A

| rpm level | emf getting | inverter/converter voltage command | winding voltage |
|---|---|---|---|
| n1 | $E_{n1}$ | $C_{n1}$ | $V_{n1}$ |
| n2 | $E_{n2}$ | $C_{n2}$ | $V_{n2}$ |
| ⋮ | ⋮ | ⋮ | ⋮ |

FIG. 4B

| time period (t2-t1) | emf getting | inverter/converter voltage command | winding voltage |
|---|---|---|---|
| △Ta | $E_{Ta}$ | $C_{Ta}$ | $V_{Ta}$ |
| △Tb | $E_{Tb}$ | $C_{Tb}$ | $V_{Tb}$ |
| ⋮ | ⋮ | ⋮ | ⋮ |

FIG. 4C

| rpm level | inverter/converter voltage command | winding voltage |
|---|---|---|
| n1 | Cn1 | Vn1 |
| n2 | Cn2 | Vn2 |
| ⋮ | ⋮ | ⋮ |

FIG. 4D

| time period (t2-t1) | inverter/converter voltage command | winding voltage |
|---|---|---|
| △Ta | $C_{Ta}$ | $V_{Ta}$ |
| △Tb | $C_{Tb}$ | $V_{Tb}$ |
| ⋮ | ⋮ | ⋮ |

MOTOR DRIVING SYSTEM AND MOTOR OPERATION RECOVERING METHOD

CROSS REFERENCE TO RELATED APPLICATIONS

This Non-provisional application claims priority under 35 U.S.C. § 119(a) on Patent Application No(s). 2016-10989321.8 filed in People's Republic of China on Nov. 10, 2016, the entire contents of which are hereby incorporated by reference.

BACKGROUND OF THE INVENTION

Field of Invention

The present invention relates to a motor driving system and a motor operation recovering method. In particular, the present invention relates to a motor driving system and a motor operation recovering method for driving a motor, which is under an inertial rotation status without being driven, to stably rotate from an original speed to a target speed.

Related Art

The rotor of a brushless DC motor is made of a magnetic material and it does not need the exciting current, so that the power loss of the rotor can be reduced so as to improve the operational efficiency. This, it can be a good, convenient, controllable and stable driving device to be applied in many applications. However, when an unexpected event or abnormal condition, such as an abnormal change of the signal level of input voltage, motor current, driver temperature, rotation speed, or the likes, happens, the general solution is to directly stop the motor driving until the unexpected event or abnormal condition is eliminated.

However, even if the stop command is issued to stop the motor, the motor will still have inertial operation before receiving a restart signal. In practice, the restart command for restarting the motor is provided when the motor is completely stopped or the rotation speed of the motor is lower than a preset rotation speed or approaches zero. Accordingly, the motor cannot operate to provide rotation speed or torque immediately after the unexpected event is eliminated but wait for a period of buffer time before restarting. Alternatively, another method is to directly apply a preset voltage to the motor coil to restart the motor immediately when the unexpected event is eliminated. Unfortunately, although this method does not need the time for waiting the motor to stop, the undesired surge current and abnormal excitation sound may be generated.

Therefore, it is desired to provide a motor driving system and a motor operation recovering method that can control immediate and continuous operation recovery of the motor and eliminate the undesired surge current and abnormal excitation sound caused by the operation recovery of the motor. Besides, it is also desired to provide a proper voltage level to the motor coil, so that the motor can be immediately and continuously restarted once the unexpected event is eliminated, thereby enhancing the working performance of the motor.

SUMMARY OF THE INVENTION

In view of the foregoing, an objective of the invention is to provide a motor driving system and a motor operation recovering method that can control immediate and continuous operation recovery of the motor and eliminate the undesired surge current and abnormal excitation sound caused by the operation recovery of the motor. Besides, the motor driving system and the motor operation recovering method of the invention can provide a proper voltage level to the motor coil, so that the motor can be immediately and continuously restarted once the unexpected event is eliminated, thereby enhancing the working performance of the motor.

To achieve the above objective, the present invention discloses a motor driving system for driving a motor, which is under an inertial rotation status without being driven, to stably rotate from an original speed to a target speed. The motor driving system includes a sensing unit, a control unit and a driving unit. The sensing unit detects a real rotating status of the motor. The control unit is electrically connected with the sensing unit and provides a gradual acceleration command based on the real rotating status. The driving unit is electrically connected with the control unit and drives the motor to accelerate stably to the target speed according to the gradual acceleration command.

To achieve the above objective, the present invention also discloses a motor operation recovering method applied with a motor driving system. The motor driving system is configured for driving a motor, which is under an inertial rotation status without being driven, to stably rotate from an original speed to a target speed. The motor driving system includes a sensing unit, a control unit and a driving unit. The control unit is electrically connected with the sensing unit, and the driving unit is electrically connected with the control unit. The motor operation recovering method includes the following steps of: detecting a real rotating status of the motor by the sensing unit; providing a gradual acceleration command by the control unit based on the real rotating status; and driving the motor to accelerate stably to the target speed by the driving unit according to the gradual acceleration command.

In one embodiment, the motor is not driven due to an alert event, and the motor driving system drives the motor to accelerate stably to the target speed after the alert event is eliminated.

In one embodiment, a rotation-speed increasing value requested by the gradual acceleration command is 10% of the original speed or less, and the gradual acceleration command corresponds to a rotation speed between 90% and 110% of the original speed.

In one embodiment, the sensing unit is an inductive electromotive force sensor, a current phase sensor or a rotation speed sensor, and the real rotating status relates to an inductive electromotive force, a coil current or a real rotation speed.

In one embodiment, the control unit is a controller. When an alert event happens, the control unit controls the driving unit to stop driving the motor. After the alert event is eliminated, the control unit controls the driving unit to drive the motor to accelerate stably to the target speed.

In one embodiment, the driving unit provides a driving voltage according to the gradual acceleration command to prevent the motor from generating a surge current.

In one embodiment, the driving voltage is obtained by searching a lookup table according to an inductive electromotive force, a coil current or a real rotation speed of the motor, or according to a time period between a start and an elimination of an alert event.

In one embodiment, the driving unit includes an inverter, and the control unit adjusts an output voltage of the inverter to control the driving unit to provide a driving voltage to drive the motor to accelerate stably to the target speed.

In one embodiment, the driving unit includes an inverter and a converter, the control unit adjusts an output voltage of the converter to adjust an output voltage of the inverter, and the driving unit is controlled to provide a driving voltage to drive the motor to accelerate stably to the target speed.

In one embodiment, the driving unit includes an inverter and a converter, the control unit adjusts an output voltage of the inverter by adjusts an output voltage of the converter and a pulse modulation method simultaneously, and the driving unit is controlled to provide a driving voltage to drive the motor to accelerate stably to the target speed.

As mentioned above, the motor driving system and the motor operation recovering method thereof of the invention can drive a motor, which is under an inertial rotation status without being driven, to stably rotate from an original speed to a target speed. The motor driving system includes a sensing unit, a control unit and a driving unit. The sensing unit detects a real rotating status of the motor. The control unit is electrically connected with the sensing unit and provides a gradual acceleration command based on the real rotating status. The driving unit is electrically connected with the control unit and drives the motor to accelerate stably to the target speed according to the gradual acceleration command. Accordingly, the motor driving system and motor operation recovering method of the invention can control immediate and continuous operation recovery of the motor and eliminate the undesired surge current and abnormal excitation sound caused by the operation recovery of the motor. Besides, the motor driving system and the motor operation recovering method of the invention can provide a proper voltage level to the motor coil, so that the motor can be immediately and continuously restarted once the unexpected event is eliminated, thereby enhancing the working performance of the motor.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
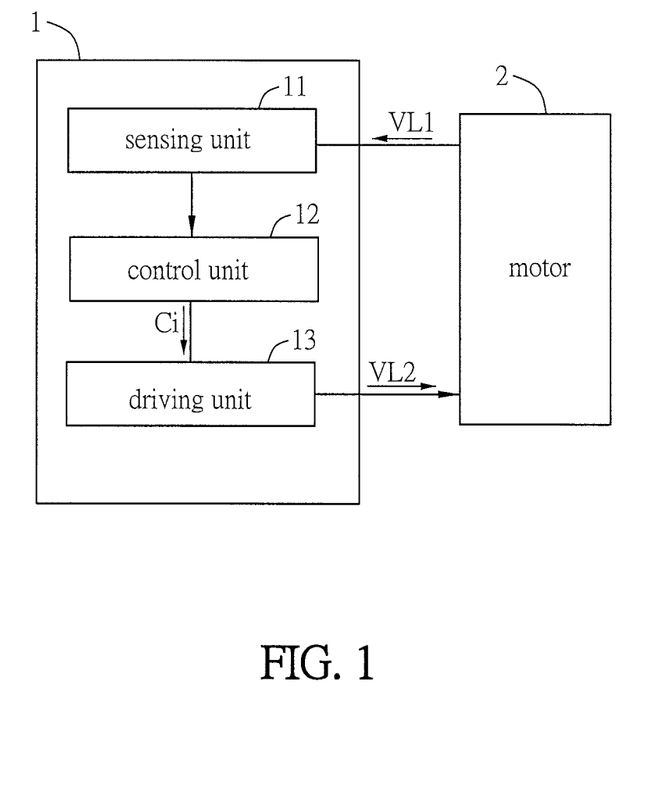
FIG. 1 is a block diagram showing a motor driving system according to an embodiment of the invention.
Figure 2:
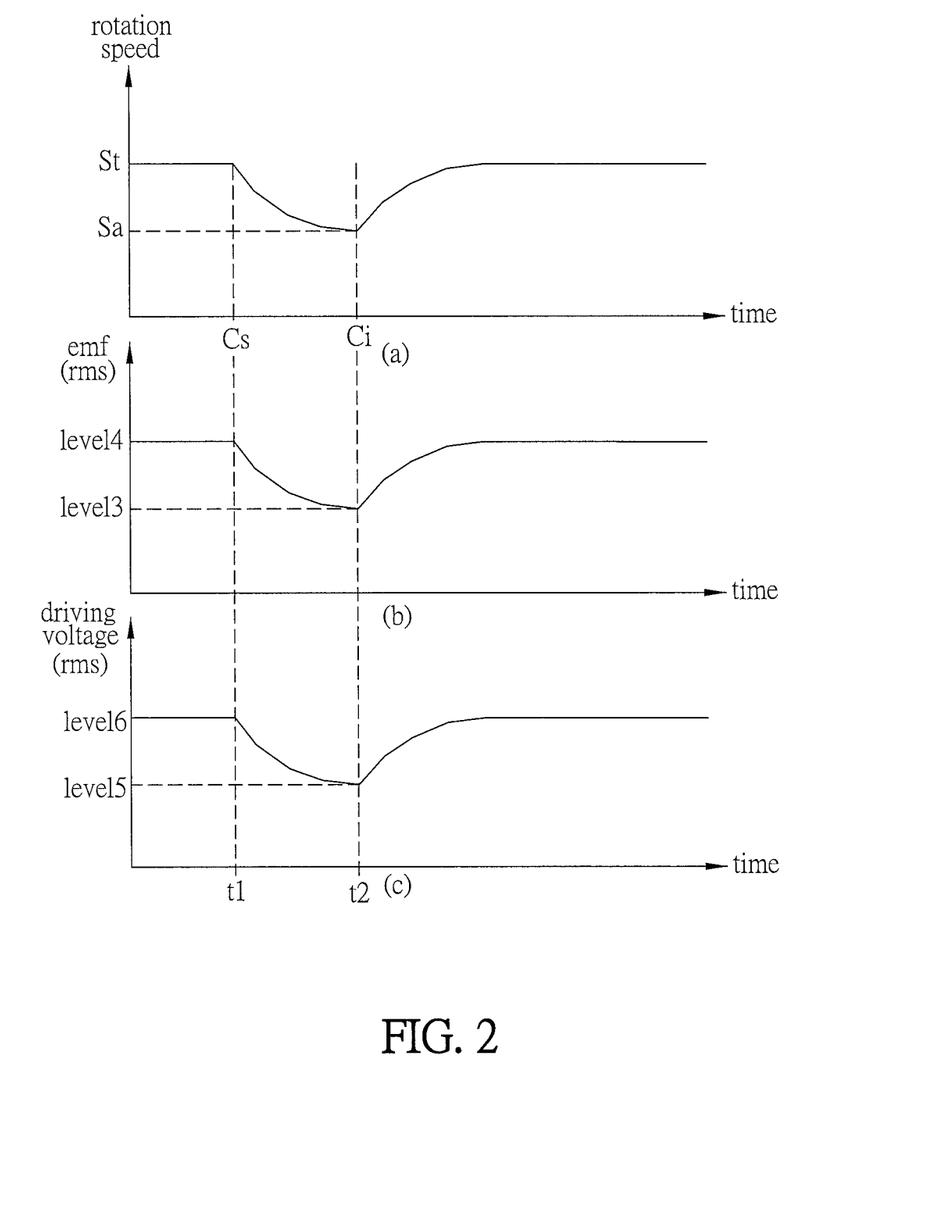
FIG. 2 is a schematic diagram showing various voltage levels of the motor under different operation statuses according to an embodiment of the invention.
Figure 3A:
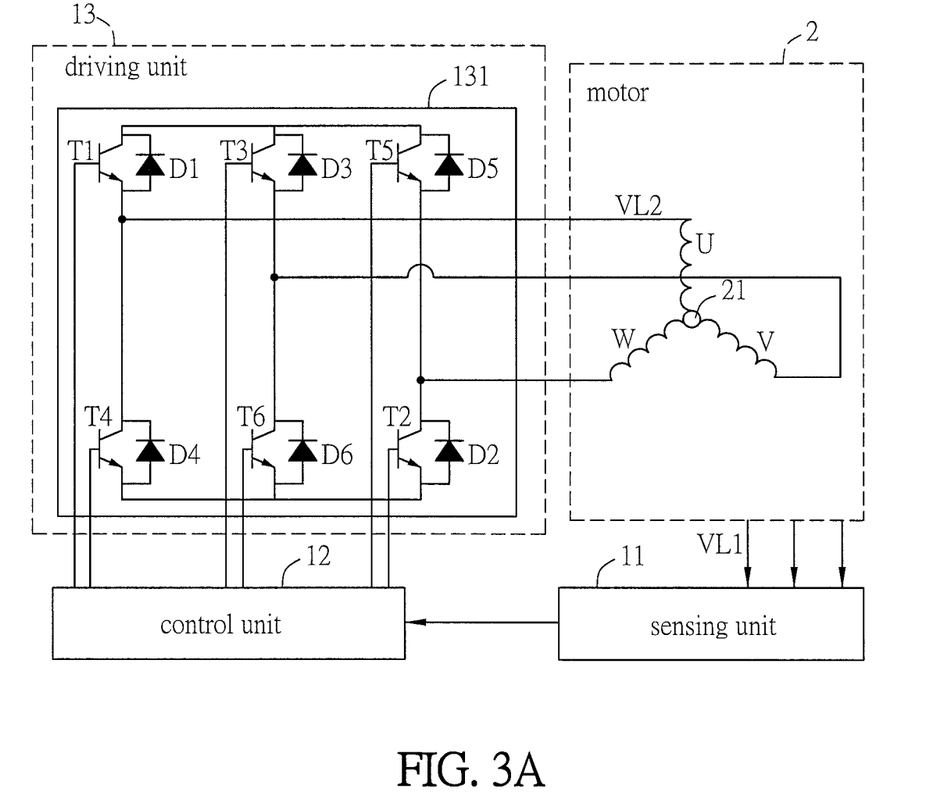
FIG. 3A is a schematic diagram showing the components of the motor driving system according to an embodiment of the invention.
Figure 3B:
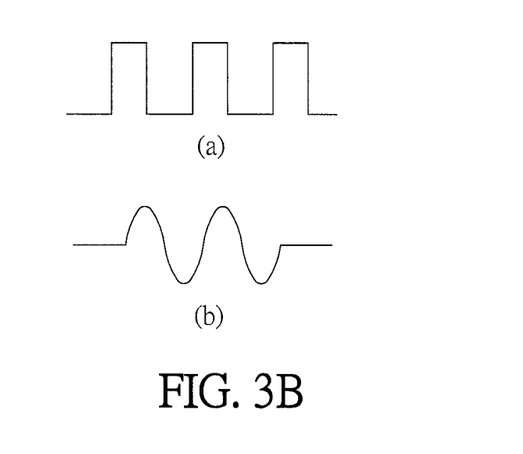
FIG. 3B is a schematic diagram showing the waveforms of the output driving voltage according to an embodiment of the invention.
Figure 4A:
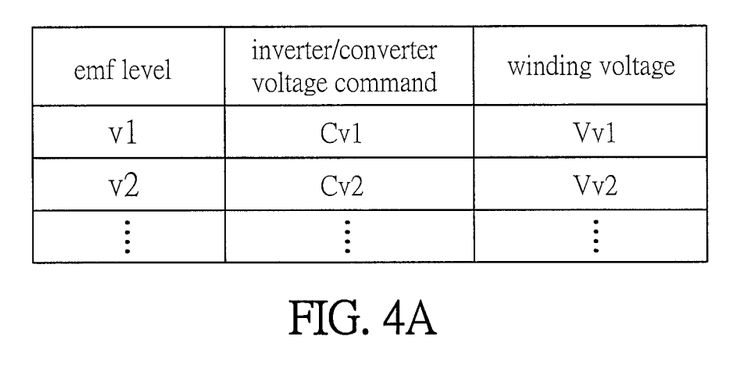
FIGS. 4A to 4C are schematic diagrams showing lookup tables of the driving voltage according to the embodiment of the invention.
Figure 4B:
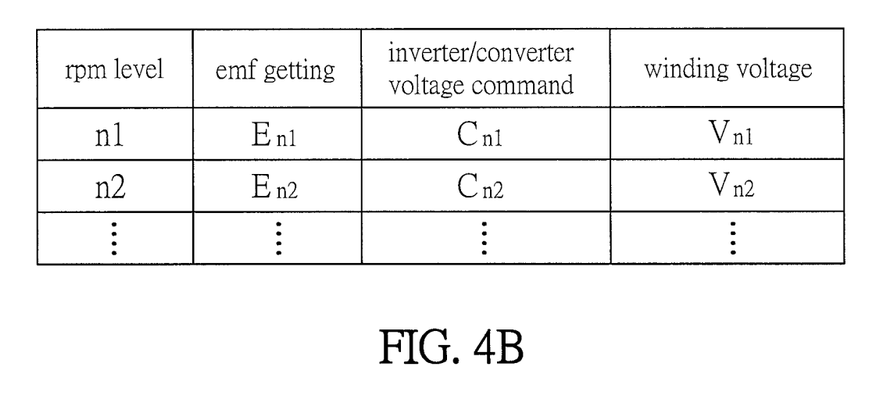
Figure 4C:
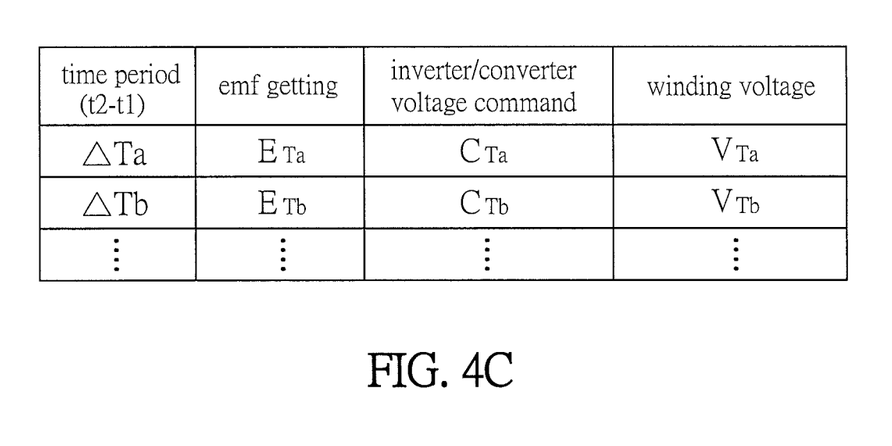
Figure 5A:
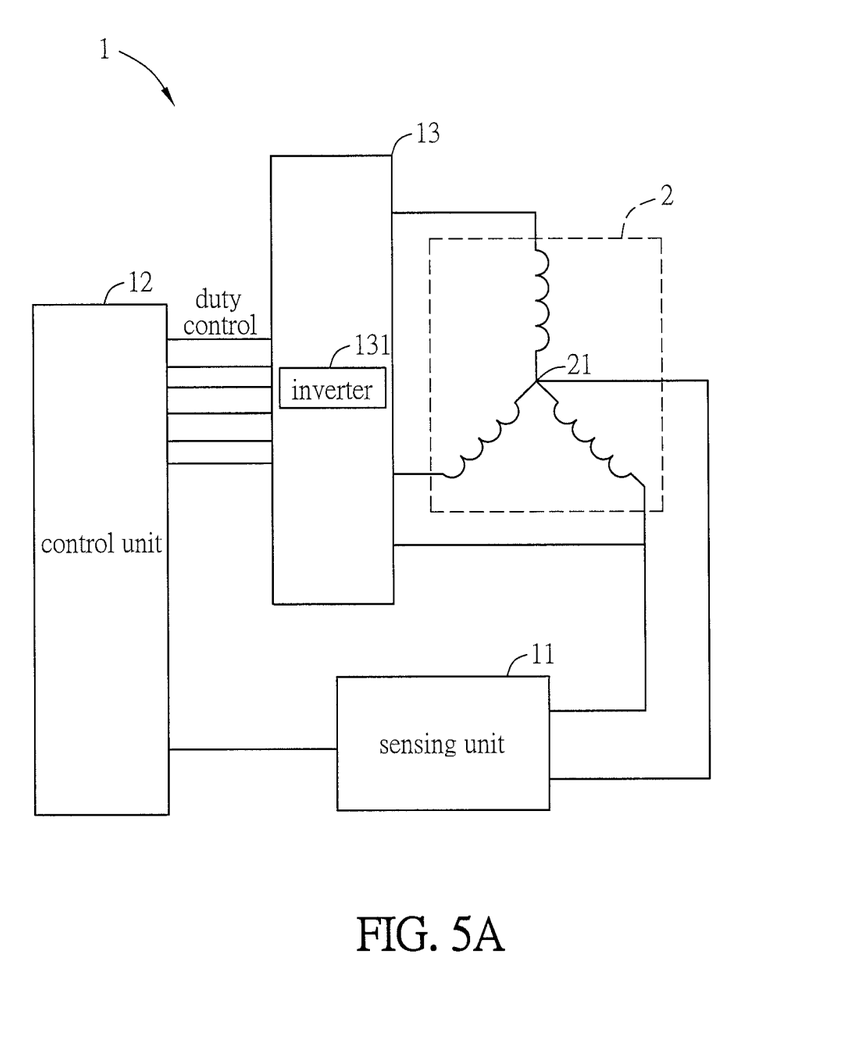
FIG. 5A is a schematic diagram showing a driving unit for driving a motor according to the embodiment of the invention.

FIG. 1 is a block diagram showing a motor driving system according to an embodiment of the disclosure. FIG. 2 is a schematic diagram showing various voltage levels of the motor under different operation statuses according to an embodiment of the invention. FIG. 3A is a schematic diagram showing the components of the motor driving system according to an embodiment of the invention, and FIG. 3B is a schematic diagram showing the waveforms of the output driving voltage according to an embodiment of the invention. FIGS. 4A to 4C are schematic diagrams showing lookup tables of the driving voltage according to the embodiment of the invention. FIG. 5A is a schematic diagram showing a driving unit for driving a motor according to the embodiment of the invention.

A motor driving system 1 of an embodiment includes a sensing unit 11, a control unit 12 and a driving unit 13. Referring the FIG. 2(a), the motor driving system 1 is configured for driving a motor, which is under an inertial rotation status without being driven, to stably rotate from an original speed Sa to a target speed St. In this embodiment, the motor is a brushless DC motor (BLDC motor). When an alert event happens, the motor is out of driving so that the motor is under an inertial rotation status without being driven.

The alert event happens at the time t1, and is eliminated at the time t2. The alert event can be any unexpected event such as the abnormal change of the signal level of the input voltage, motor current, motor or driver temperature, rotation speed and the likes. After the alert event is eliminated, the motor driving system 1 can immediately drive the motor 2 to stably rotate to the target speed St. In other words, when the alert event happens (t1), the control unit 12 controls the driving unit 13 to stop driving the motor. In this case, the control unit 12 provide a stop command Cs. In addition, when the alert event is eliminated (t2), the control unit 12 can control the driving unit 13 to drive the motor 2 to stably rotate to the target speed St. In this case, the control unit 12 provide a gradual acceleration command Ci.

Referring to FIG. 3A, the motor 2 has a permanent magnet rotor, and a stator thereof has a three phase coil 21, which includes the coils U, V and W. The motor driving system 1 sends a three phase power source, which has 120 degrees of phase difference, to the three phase coil 21. Based on the signal of the hall sensor, the rotor angle can be divided into six regions, and each region is 60 degrees. The motor 2 can operate as two of coils U, V and W of the three phase coil 21 are conducted. Accordingly, different control signals are applied to different regions so as to generate the magnetic forces of different directions for driving the motor 2 to rotate. This driving method is named as a six-step square-wave driving method. The other technical features of the motor 2 are well known by the skilled persons in the art, so the detailed descriptions thereof will be omitted.

The sensing unit 11 can be electrically connected to the motor 2, and it can be an inductive electromotive force sensor, a current phase sensor or a rotation speed sensor for detecting a real rotating status of the motor 2. In practice, the hall sensor of the motor 2 can detect the position of the rotor and feedback the corresponding signal, and the signal indicating the real rotating status of the motor, such as the inductive electromotive force, the coil current, or the rotation speed of the motor 2, can be detected.

Referring to FIGS. 1, 3A and 5A, the sensing unit 11 is electrically connected to the motor 2 for sensing a first voltage level VL1 of the motor 2. In this case, the sensing unit 11 is an inductive electromotive force sensor. In other words, the sensing unit 11 can sense the inductive electromotive force or the voltage level of the three phase coil 21 of the motor 2, thereby detecting the real rotating status of the motor 2. In addition, the position feedback signal of the motor 2 and the signal of the real rotating status of the motor 2 can be digital signals or analog signals, which are processed by a circuit and sent to the control unit 12.

The control unit 12 is electrically connected to the sensing unit 11 and is capable of providing a gradual acceleration command Ci based on the real rotating status of the motor 2. The control unit 12 can be, for example, a control IC, a controller, a micro control unit (MCU), or a digital signal processor (DSP), or their combinations. The control unit 12 can be integrated in a control circuit board for integrating the control driving circuit of the entire system. Preferably, the control unit 12 may include a plurality of sets of I/O pins for PWM signal outputting, signal inputting of hall sensor, and A/D conversion signal inputting.

The driving unit 13 includes an inverter 131. In this embodiment, the inverter 131 can be a semiconductor switch, such as a bipolar junction transistor (BJT), an insulated gate bipolar transistor (IGBT), or a metal-oxide-semiconductor field-effect transistor (MOSFET), for controlling the motor 2. To be noted, the transistor of the driving unit 13 must be selected based on the loading limitation of the highest current for preventing the damage of the component during the operation. In this embodiment, the inverter 131 of the driving unit 13 includes six insulated gate bipolar transistors for example.

The driving unit 13 is electrically connected with the control unit 12 and drives the motor 2 to accelerate stably to the target speed St according to the gradual acceleration command Ci. In more detailed, the driving unit 13 provides a second voltage level VL2 according to the gradual acceleration command Ci for driving the motor 2 to accelerate stably to the target speed St. In the following description, the second voltage level VL2 is also called as the driving voltage of the motor.

As shown in FIG. 3A, the driving unit 13 includes three half-bridge circuits composed of six insulated gate bipolar transistors T1 to T6. The transistors T1, T3 and T5 are the upper arms of the driving unit 13, and the transistors T2, T4 and T6 are the lower arms of the driving unit 13. Each of the transistors T1 to T6 includes a diode (diodes D1 to D6 respectively). The coils U, V and W of the three phase coil 21 of the motor 2 are electrically connected to the middles of the three half-bridge circuits, respectively. Accordingly, when the control unit 12 outputs signals to conduct the transistors T1 and T6, the coil U is coupled to the positive power source and the coil W is coupled to the negative power source for driving the motor 2 to rotate.

In addition, the driving unit 13 further provides a driving voltage according to the gradual acceleration command Ci to prevent the motor 2 from generating a surge current. In more detailed, the control unit 12 of this embodiment is a controller for adjusting the output voltage of the inverter 131 (the driving voltage VL2). Accordingly, the driving unit 13 can provide the driving voltage VL2 to drive the motor 2 to stably accelerate to the target speed St and to prevent the motor 2 from generating a surge current.

In practice, since the sensing unit 11 is an inductive electromotive force sensor, the motor driving system 1 can use the sensing unit 11 to detect the inductive electromotive force of the three phase coil 21 of the motor 2 so as to determine the provided driving voltage to the three phase coil 21 for driving the motor 2. In more detailed, the rotation speed of the motor 2 and the driving voltage have a proportional relation. Thus, the rotation speed of the motor 2 is faster if the applied voltage is higher. Since the voltage of the power source of the motor 2 is fixed, the driving voltage inputted to the motor 2 can be changed by the following approaches for controlling the motor 2 to stably rotate from the original speed Sa to the target speed St.

As shown in FIG. 3B, the control unit 12 can adjust the driving voltage VL2 (the square waves of FIG. 3B) outputted from the driving unit 13 by pulse width modulation (PWM) technology. The control unit 12 can control the duty cycles or the duty ratios of the transistors T1 to T6 by PWM control so as to directly control the driving voltage of the motor 2. In other words, the motor driving system 1 can control the duty cycles or the duty ratios of the transistors T1 to T6 by PWM technology so as to adjust the driving voltage VL2 outputted from the driving unit 13 for controlling the motor 2 to stably rotate from the original speed Sa to the target speed St. In addition, the control unit 12 can control the switching mode of pulse width modulation for preventing the power failure, short circuit, overcurrent and overheating of the motor driving system 1.

After the sensing unit 11 detects the inductive electromotive force of the three phase coil 21, the control unit 12 can obtain the corresponding gradual acceleration command Ci from the driving voltage lookup table as shown in FIG. 4A. Then, the control unit 12 can provide a proper driving voltage level to the three phase coil 21 for driving the motor 2 to stably rotate to the target speed St.

The sensing unit 11 can determine the first voltage level VL1 (the inductive electromotive force) by one of the following two methods. In the first method, the sensing unit 11 directly samples the voltage of one or more of the coils in the three phase coil 21. For example, as shown in FIG. 2(b), the voltage level 3 or the voltage level 4 is sampled. In the second method, as shown in FIG. 4B, the sensing unit 11 detects the rotation speed of the motor 2 and then calculates or searches the lookup table to obtain the inductive electromotive force. Otherwise, as shown in FIG. 4C, the sensing unit 11 detects the time period from the start to the end of the alert event (t2−t1) and then calculates or searches the lookup table to obtain the inductive electromotive force (see FIG. 4E). The detailed sensing method of the second method will be illustrated hereinafter.

As mentioned above, the sensing unit 11 can obtain the inductive electromotive force of the three phase coil 21. After obtaining the inductive electromotive force of the three phase coil 21, the control unit 12 can retrieve the corresponding gradual acceleration command Ci to determine the proper driving voltage level to be provided to the three phase coil 21 for driving the motor 2 to stably rotate to the target speed St. For example, as shown in FIG. 2(c), the voltage level 6 is provided at the start of the alert event, and voltage level 5 is provided at the end of the alert event.

The target speed St can be twice or more of the original speed Sa of the motor 2. For example, when the original speed Sa of the motor 2 is 250 rpm, the control unit 12 can set the target speed St to 500 rpm. When the original speed Sa of the motor 2 is 500 rpm, the control unit 12 can set the target speed St to 1000 rpm. In addition, the rotation-speed increasing value requested by the gradual acceleration command Ci is 10% of the original speed Sa or less, and the gradual acceleration command Ci corresponds to a rotation speed between 90% and 110% of the original speed Sa. For example, when original speed Sa of the motor 2 is 2000 rpm, the rotation-speed increasing value corresponding to the gradual acceleration command Ci is 200 rpm or less, and the rotation speed corresponding to the gradual acceleration command Ci is between 1800 rpm and 2200 rpm.

According to the above limitations for increasing the rotation speed, the motor 2 can be stably accelerated to the target speed St without generating the abnormal excitation sound caused by the over-speeding in the operation recovery of the motor 2. Thus, the lifetime of the product can be maintained. Accordingly, the motor driving system can control the immediately and continuously rotation operation and prevent the abnormal excitation sound caused by the over-speeding in the operation recovery of the motor 2.

In this embodiment, since the motor driving system includes a sensing unit for detecting the inductive electromotive force of the three phase coil of the motor, a control unit electrically connected with the sensing unit for providing a gradual acceleration command by a lookup table based on the inductive electromotive force of the three phase coil, and a driving unit electrically connected with the control unit for controlling the motor to stably accelerate to the target speed according to the gradual acceleration command. Accordingly, the motor, which is under an inertial rotation status without being driven, can be controlled to stably accelerate from the original speed to the target speed.

Figure 5B:
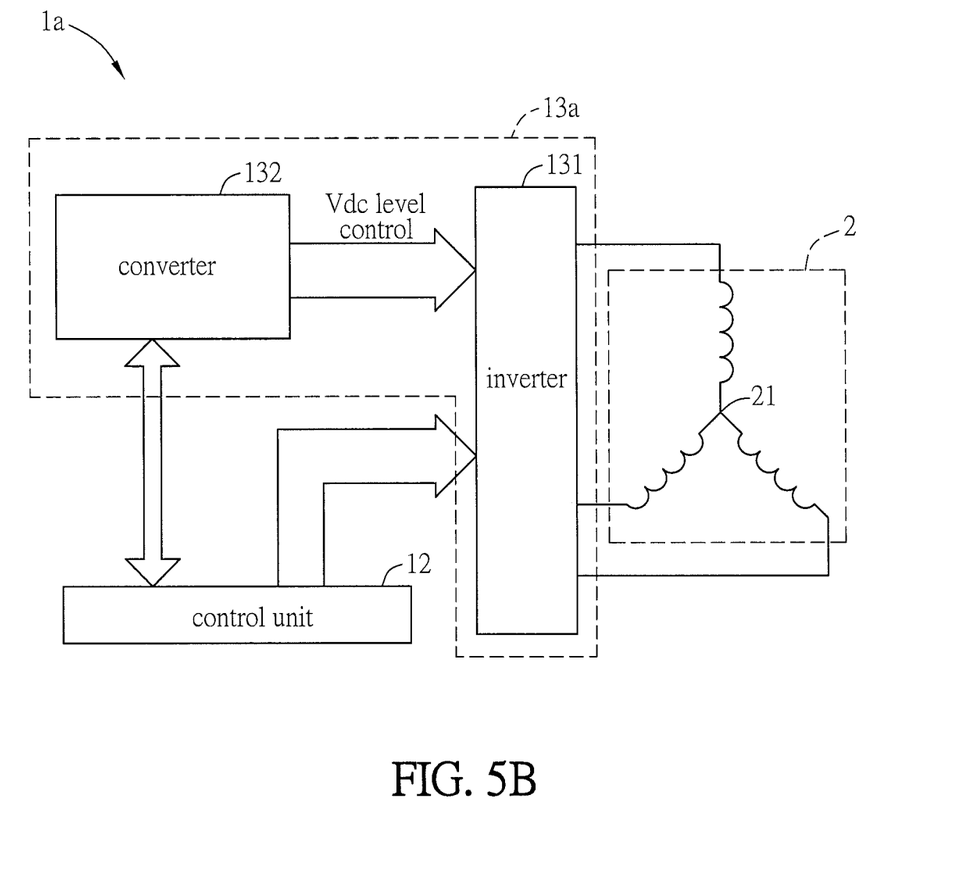
FIG. 5B is a schematic diagram showing a driving unit for driving a motor according to another embodiment of the invention.
Figure 5C:
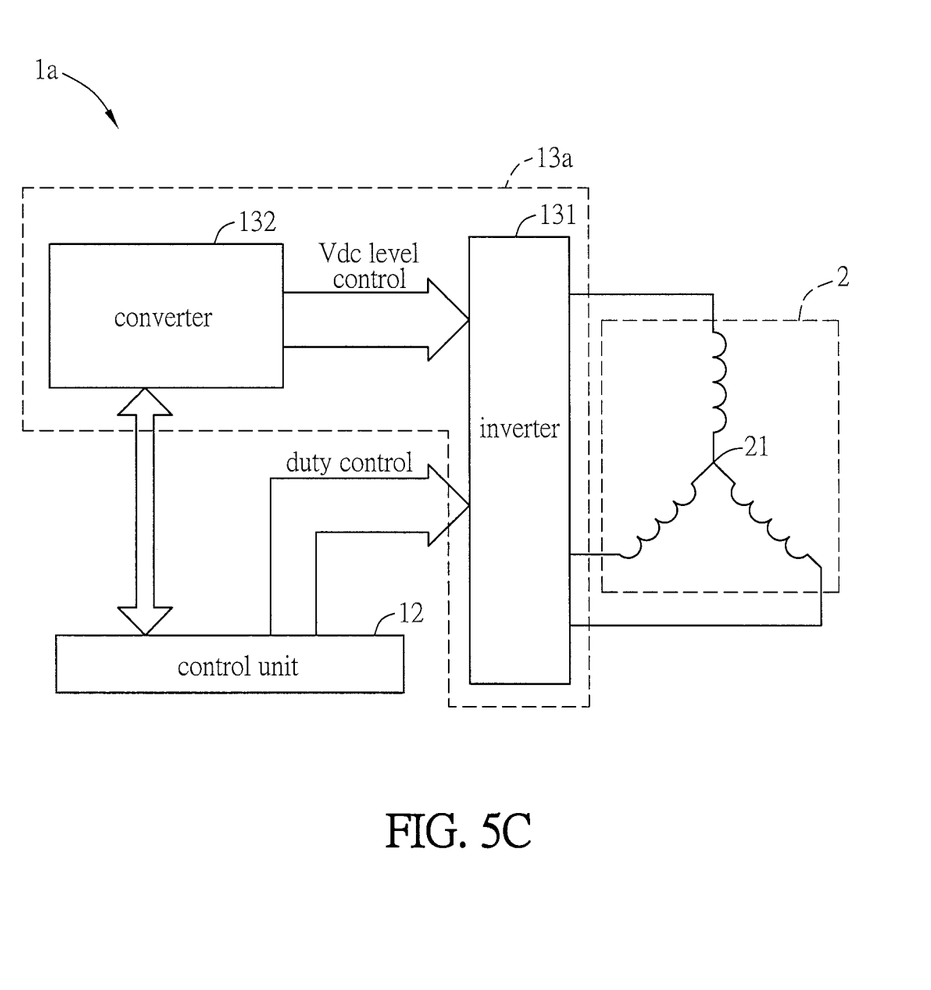
FIG. 5C is a schematic diagram showing a driving unit for driving a motor according to another embodiment of the invention.

Different methods for adjusting the driving voltage of the motor coil will be described herein below with reference to FIGS. 5B and 5C. FIG. 5B is a schematic diagram showing a driving unit for driving a motor according to another embodiment of the invention, and FIG. 5C is a schematic diagram showing a driving unit for driving a motor according to still another embodiment of the invention. To be noted, FIGS. 5B and 5C are for illustrating different method for adjusting the driving voltage by the driving unit, so that the sensing unit 11 is not shown in the motor driving system 1a.

As shown in FIG. 5B, the components and connections of the motor driving system 1a are mostly the same as those of the motor driving system 1. Different from the motor driving system 1, which includes only one inverter 131, the driving unit 13a of the motor driving system 1a includes an inverter 131 and a converter 132. The converter 132 can be an AC/DC converter, a DC/DC converter, an isolated converter, a non-isolated converter, a buck converter, a boost converter, or a buck-boost converter. Accordingly, the control unit 12 can adjust the output voltage of the converter 132 only (Vdc level control) for adjusting the output voltage of the inverter 131 to enable the driving unit 13a to provide a driving voltage VL2 (the output voltage of the inverter 131) for driving the motor 2 to stably accelerate to the target speed St.

Referring to FIG. 5C, the driving unit 13a of the motor driving system 1a includes an inverter 131 and a converter 132. The control unit 12 can adjust the output voltage of the converter 132 (Vdc level control) for adjusting the output voltage of the inverter 131 and adjust the output voltage of the inverter 131 by PWM technology (duty control). Then, the driving unit 13a can be controlled to provide a driving voltage VL2 (the output voltage of the inverter 131) for driving the motor 2 to stably accelerate to the target speed St.

In this embodiment, the driving unit includes an inverter and a converter. The control unit can adjust the output voltage of the converter only for controlling the driving unit to provide a driving voltage for driving the motor to stably accelerate to the target speed. Alternatively, the control unit can adjust the output voltage of the converter (Vdc level control) and adjust the output voltage of the inverter by PWM technology (duty control). Then, the driving unit can be controlled to provide a driving voltage (the output voltage of the inverter) for driving the motor to stably accelerate to the target speed. The above mentioned technical approaches can drive a motor, which is under an inertial rotation status without being driven, to stably rotate from an original speed to a target speed.

Figure 4D:
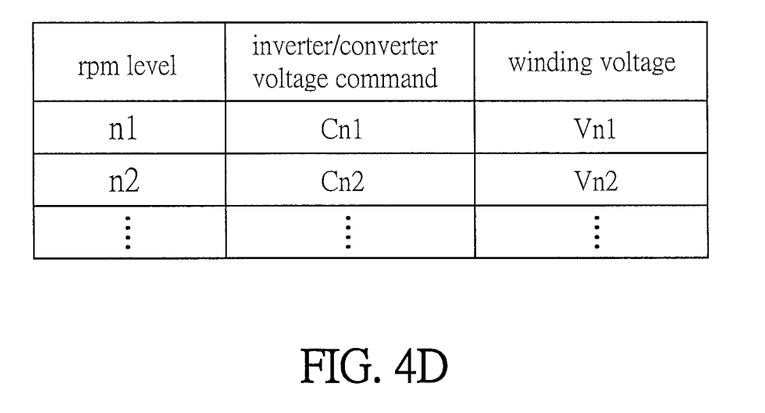
FIG. 4D is a schematic diagram showing a lookup table of the driving voltage according to another embodiment of the invention.
Figure 6:
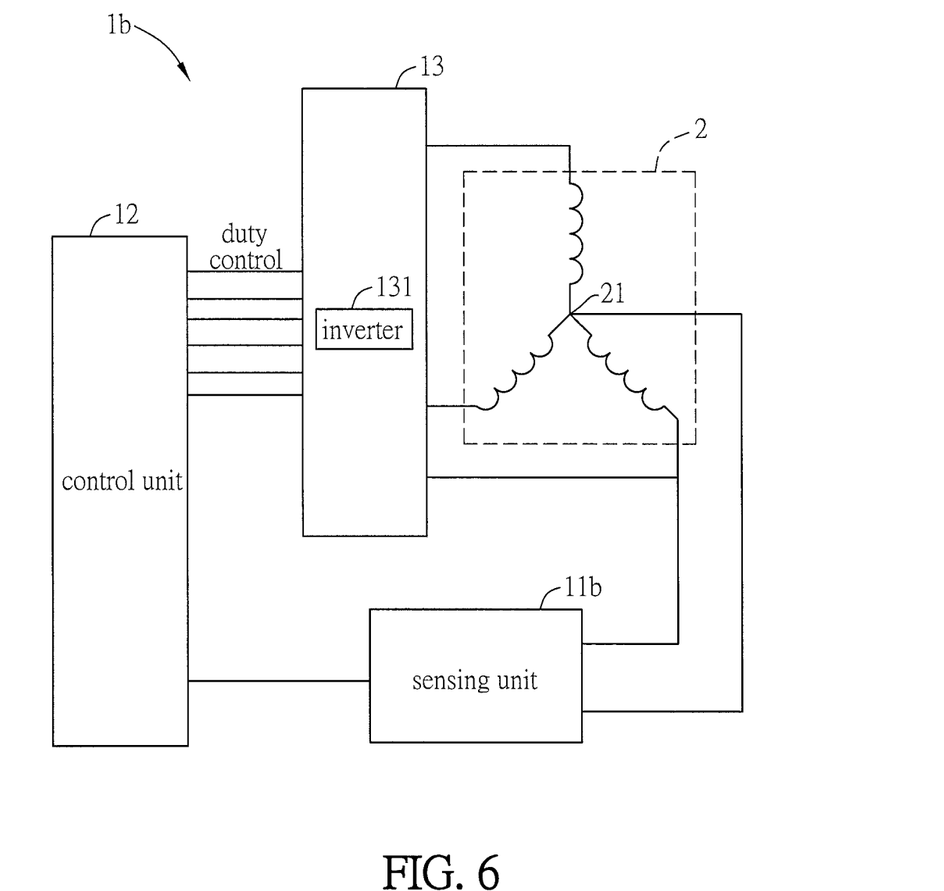
FIG. 6 is a schematic diagram showing a motor driving system having another sensing unit according to another embodiment of the invention.

FIG. 4D is a schematic diagram showing a lookup table of the driving voltage according to another embodiment of the invention, and FIG. 6 is a schematic diagram showing a motor driving system having another sensing unit according to another embodiment of the invention.

As shown in FIG. 6, the components, connections and adjusting method for the driving voltage of the motor driving system 1b are mostly the same as those of the motor driving system 1. Different from the motor driving system 1, which includes an inductive electromotive force sensor (the sensing unit 11), the sensing unit 11a of the motor driving system 1b is a rotation speed sensor. In this embodiment, the sensing unit 11b can utilize a rotary encoder or a tacho generator (TG) to detect the rotation speed of the motor 2.

In other words, the motor driving system 1b can detect the rotation speed of the motor 2 for determining the real rotating status of the motor to provide the driving voltage to the three phase coil 21 instead of detecting the inductive electromotive force of the three phase coil 21 of the motor 2 for determining the proper driving voltage level to be provided to the three phase coil 21. After the sensing unit 11b determined the rotation speed of the motor 2, the control unit 12 can retrieve the corresponding gradual acceleration command Ci from the lookup table as shown in FIG. 4D, thereby determining the proper driving voltage level to be provided to the three phase coil 21. Accordingly, the motor 2 can be driven to stably rotate to the target speed St.

In this embodiment, since the motor driving system includes a sensing unit for detecting the rotation speed of the motor, a control unit electrically connected with the sensing unit for providing a gradual acceleration command by a lookup table based on the rotation speed of the motor, and a driving unit for controlling the motor to stably accelerate to the target speed according to the gradual acceleration command. Accordingly, the motor, which is under an inertial rotation status without being driven, can be controlled to stably accelerate from the original speed to the target speed.

Figure 4E:
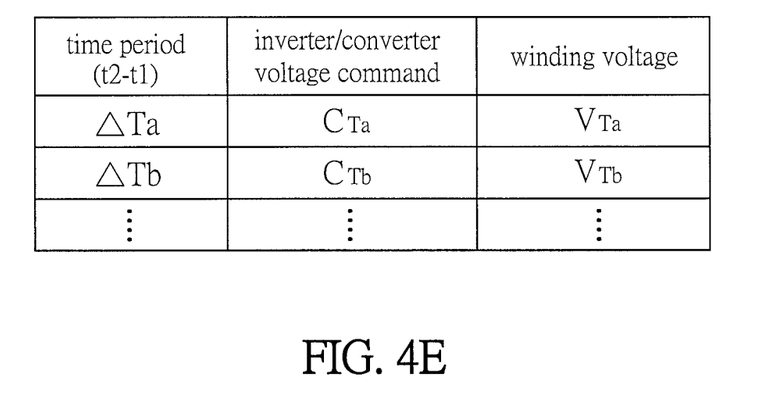
FIG. 4E is a schematic diagram showing a lookup table of the driving voltage according to another embodiment of the invention.

FIG. 4E is a schematic diagram showing a lookup table of the driving voltage according to still another embodiment of the invention. The components and connections of the motor driving system of this embodiment are mostly the same as those of the motor driving system 1. Different from the motor driving system 1, which determines the inductive electromotive force of the three phase coil 21 by the sensing unit 11 and then obtains the gradual acceleration command Ci from the driving voltage lookup table by the control unit 12 for determining the proper driving voltage level to be provided to the three phase coil 21, the motor driving system of this embodiment does not detect the inductive electromotive force of the three phase coil 21 by the sensing unit 11 for determining the proper driving voltage level to be provided to the three phase coil 21.

In this embodiment, the sensing unit can detect a time period between a start and an elimination of an alert event (t2-t1) as the real rotating status of the motor, and then the control unit 12 obtains the gradual acceleration command from the lookup table as shown in FIG. 4E for determining the proper driving voltage level to be provided to the three phase coil. Accordingly, the motor can be driven to stably rotate to the target speed. For example, the sensing unit can estimate the variation of the rotation speed of the motor or other levels corresponding to the time period of the alert event accordingly the preset parameters and a proper algorithm, and the lookup table includes the corresponding driving voltages. Thus, the driving unit can receive a proper driving voltage and drive the motor to stably accelerate from the original speed (or the current speed) to the target speed.

In addition, the sensing unit may detect the values and phases of the coil current of the motor as the real rotating status of the motor, and the control unit can obtain the corresponding gradual acceleration command from the lookup table (not shown) according to the real rotating status for determining the proper driving voltage level to be provided to the three phase coil. Then, the driving unit can receive the driving voltage and drive the motor to stably accelerate to the target speed. In other words, the sensing unit can be a current detector or a current meter for detecting the values and phases of the coil current of the motor so as to determine the driving voltage level to be provided to the three phase coil by the lookup table.

In the motor driving system of this embodiment, the motor driving system includes a sensing unit for detecting the time period between the start and end of the alert event or the values and phases of the motor current, a control unit electrically connected with the sensing unit for providing a gradual acceleration command by a lookup table based on the time period between the start and end of the alert event or the values and phases of the motor current, and a driving unit for controlling the motor to stably accelerate to the target speed according to the gradual acceleration command. Accordingly, the motor, which is under an inertial rotation status without being driven, can be controlled to stably accelerate from the original speed to the target speed.

Figure 7:
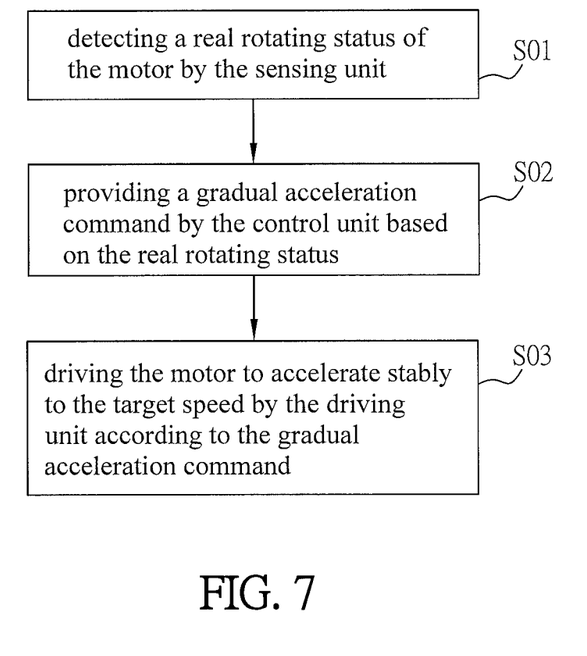
FIG. 7 is a flow chart of a motor operation recovering method according to an embodiment of the invention.

FIG. 7 is a flow chart of a motor operation recovering method according to an embodiment of the invention. As shown in FIG. 7, the motor operation recovering method is applied with a motor driving system. The motor driving system is configured for driving a motor, which is under an inertial rotation status without being driven, to stably rotate from an original speed to a target speed. The motor driving system includes a sensing unit, a control unit and a driving unit. The control unit is electrically connected with the sensing unit, and the driving unit is electrically connected with the control unit. The other components and connections of the motor driving system can be referred to the above mentioned embodiments, so the detailed descriptions thereof will be omitted.

The motor operation recovering method includes the following steps of: detecting a real rotating status of the motor by the sensing unit (step S01); providing a gradual acceleration command by the control unit based on the real rotating status (step S02); and driving the motor to accelerate stably to the target speed by the driving unit according to the gradual acceleration command (step S03).

The other technical features of the motor operation recovering method can be referred to the above-mentioned embodiments, so the detailed descriptions thereof will be omitted.

In summary, the motor driving system and the motor operation recovering method thereof of the invention can drive a motor, which is under an inertial rotation status without being driven, to stably rotate from an original speed to a target speed. The motor driving system includes a sensing unit, a control unit and a driving unit. The sensing unit detects a real rotating status of the motor. The control unit is electrically connected with the sensing unit and provides a gradual acceleration command based on the real rotating status. The driving unit is electrically connected with the control unit and drives the motor to accelerate stably to the target speed according to the gradual acceleration command. Accordingly, the motor driving system and motor operation recovering method of the invention can control immediate and continuous operation recovery of the motor and eliminate the undesired surge current and abnormal excitation sound caused by the operation recovery of the motor. Besides, the motor driving system and the motor operation recovering method of the invention can provide a proper voltage level to the motor coil, so that the motor can be immediately and continuously restarted once the unexpected event is eliminated, thereby enhancing the working performance of the motor.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor driving system for driving a motor, which is under an inertial rotation status without being driven, to stably rotate from an inertial rotation speed to a target speed, the motor driving system comprising:

a sensing unit detecting a time period of the inertial rotation status between a start and an elimination of an alert event as a real rotating status of the motor;

a control unit electrically connected with the sensing unit and providing a gradual acceleration command based on the real rotating status, wherein the control unit takes the time period of the inertial rotation status as a search key to obtain the gradual acceleration command from a correction-after-alert-event lookup table for determining the proper driving voltage level to be provided to coils so as to drive the motor to stably rotate from the inertial rotation speed to the target speed, a driving voltage is obtained by searching the lookup table according to the time period of the inertial rotation status between the start and the elimination of the alert event and configured to control immediate and continuous operation recovery of the motor and eliminate undesired surge current and abnormal excitation sound caused by the operation recovery of the motor; and a driving unit electrically connected with the control unit and configured to provide the driving voltage to drive the motor to accelerate stably to the target speed according to the gradual acceleration command.

2. The motor driving system of claim 1, wherein the motor is not driven by the motor driving system in the alert event, and the motor driving system drives the motor to accelerate stably to the target speed after the alert event is eliminated.

3. The motor driving system of claim 1, wherein a rotation-speed increasing value requested by the gradual acceleration command is 10% of the inertial rotation speed or less, and the gradual acceleration command corresponds to a rotation speed between 90% and 110% of the inertial rotation speed.

4. The motor driving system of claim 1, wherein the sensing unit is an inductive electromotive force sensor, a current phase sensor or a rotation speed sensor, and the real rotating status relates to an inductive electromotive force, a coil current or a real rotation speed.

5. The motor driving system of claim 1, wherein the control unit is a controller,
when the alert event happens, the control unit controls the driving unit to stop driving the motor; and
after the alert event is eliminated, the control unit controls the driving unit to drive the motor to accelerate stably to the target speed.

6. The motor driving system of claim 1, wherein the driving unit provides the driving voltage according to the gradual acceleration command to prevent the motor from generating a surge current.

7. The motor driving system of claim 1, wherein the driving unit comprises an inverter, and the control unit adjusts an output voltage of the inverter to control the driving unit to provide a driving voltage to drive the motor to accelerate stably to the target speed.

8. The motor driving system of claim 1, wherein the driving unit comprises an inverter and a converter, the control unit adjusts an output voltage of the converter to adjust an output voltage of the inverter, and the driving unit is controlled to provide a driving voltage to drive the motor to accelerate stably to the target speed.

9. The motor driving system of claim 1, wherein the driving unit comprises an inverter and a converter, the control unit adjusts an output voltage of the inverter by adjusts an output voltage of the converter and a pulse modulation method simultaneously, and the driving unit is controlled to provide a driving voltage to drive the motor to accelerate stably to the target speed.

10. A motor operation recovering method applied with a motor driving system, wherein the motor driving system is configured for driving a motor, which is under an inertial rotation status without being driven, to stably rotate from an inertial rotation speed to a target speed, the motor driving system comprises a sensing unit, a control unit and a driving unit, the control unit is electrically connected with the sensing unit, and the driving unit is electrically connected with the control unit, the motor operation recovering method comprising steps of:
detecting a time period of the inertial rotation status between a start and an elimination of an alert event as a real rotating status of the motor by the sensing unit;
providing a gradual acceleration command by the control unit based on the real rotating status, wherein the control unit takes the time period of the inertial rotation status as a search key to obtain the gradual acceleration command from a correction-after-alert-event lookup table for determining the proper driving voltage level to be provided to coils so as to drive the motor to stably rotate from the inertial rotation speed to the target speed, a driving voltage is obtained by searching the lookup table according to the time period of the inertial rotation status between the start and the elimination of the alert event and configured to control immediate and continuous operation recovery of the motor and eliminate undesired surge current and abnormal excitation sound caused by the operation recovery of the motor; and
providing the driving voltage to drive the motor to accelerate stably to the target speed by the driving unit according to the gradual acceleration command.

11. The motor operation recovering method of claim 10, wherein the motor is not driven by the motor driving system in the alert event, and the motor driving system drives the motor to accelerate stably to the target speed after the alert event is eliminated.

12. The motor operation recovering method of claim 10, wherein a rotation-speed increasing value requested by the gradual acceleration command is 10% of the inertial rotation speed or less, and the gradual acceleration command corresponds to a rotation speed between 90% and 110% of the inertial rotation speed.

13. The motor operation recovering method of claim 10, wherein the sensing unit is an inductive electromotive force sensor, a current phase sensor or a rotation speed sensor, and the real rotating status relates to an inductive electromotive force, a coil current or a real rotation speed.

14. The motor operation recovering method of claim 10, wherein the control unit is a controller,
when the alert event happens, the control unit controls the driving unit to stop driving the motor; and
after the alert event is eliminated, the control unit controls the driving unit to drive the motor to accelerate stably to the target speed.

15. The motor operation recovering method of claim 10, wherein the driving unit provides the driving voltage according to the gradual acceleration command to prevent the motor from generating a surge current.

16. The motor operation recovering method of claim 10, wherein the driving unit comprises an inverter, and the control unit adjusts an output voltage of the inverter to control the driving unit to provide a driving voltage to drive the motor to accelerate stably to the target speed.

17. The motor operation recovering method of claim 10, wherein the driving unit comprises an inverter and a converter, the control unit adjusts an output voltage of the converter to adjust an output voltage of the inverter, and the driving unit is controlled to provide a driving voltage to drive the motor to accelerate stably to the target speed.

18. The motor operation recovering method of claim 10, wherein the driving unit comprises an inverter and a converter, the control unit adjusts an output voltage of the inverter by adjusts an output voltage of the converter and a pulse modulation method simultaneously, and the driving unit is controlled to provide a driving voltage to drive the motor to accelerate stably to the target speed.

* * * * *